United States Patent [19]

Nieman et al.

[11] Patent Number: 4,592,556
[45] Date of Patent: Jun. 3, 1986

[54] SLIP JOINT SEAL ASSEMBLY

[75] Inventors: Andrew L. Nieman, Temperance, Mich.; Ray A. Gall, Toledo, Ohio

[73] Assignee: Dana Corporation, Toledo, Ohio

[21] Appl. No.: 682,121

[22] Filed: Dec. 17, 1984

[51] Int. Cl.⁴ .................... F16J 15/32; F16J 15/46
[52] U.S. Cl. .................................. 277/27; 277/152; 277/237 R; 464/173
[58] Field of Search ............... 277/3, 27, 134, 152, 277/153, 237; 464/173–175

[56] References Cited

U.S. PATENT DOCUMENTS

| | | | |
|---|---|---|---|
| 2,177,441 | 10/1939 | Pesarese | 277/152 |
| 3,248,900 | 5/1966 | Shurts | 64/23 |
| 3,633,383 | 1/1972 | Kleinschmidt | 64/23 |
| 3,940,948 | 3/1971 | Schultenkamper | 64/17 R |
| 3,942,336 | 3/1976 | Schultenkamper | 64/23 |
| 4,094,512 | 6/1978 | Back | 277/27 |
| 4,131,375 | 12/1978 | Fisher | 403/13 |
| 4,166,628 | 9/1979 | Blaydon | 277/152 |
| 4,243,232 | 1/1981 | Repella | 277/37 |
| 4,336,945 | 6/1982 | Christiansen et al. | 277/153 |

FOREIGN PATENT DOCUMENTS 880243 12/1942 France .................................. 277/27

Primary Examiner—Robert S. Ward
Attorney, Agent, or Firm—Frank B. McDonald

[57] ABSTRACT

A slip joint seal assembly includes an elastomeric sealing body and an annular metallic cage circumferentially supporting the body. The assembly also includes a relubrication chamber. An auxiliary sealing lip on the elastomeric sealing body is normally out of contact with a shaft, but engages the shaft upon pressurization of the relubrication chamber to prevent lubrication from flowing toward primary sealing lips on the sealing body during relubrication. In a preferred form, the elastomeric sealing body includes a pair of sealing lips disposed for making angular contact with the shaft, while the auxiliary lip is also angularly disposed with respect to the shaft but in an axially opposite direction. In an alternate preferred form, an annular ring provides a reduction in volume of the relubrication chamber between the cage and shaft to enhance pressurization characteristics of the chamber.

15 Claims, 3 Drawing Figures

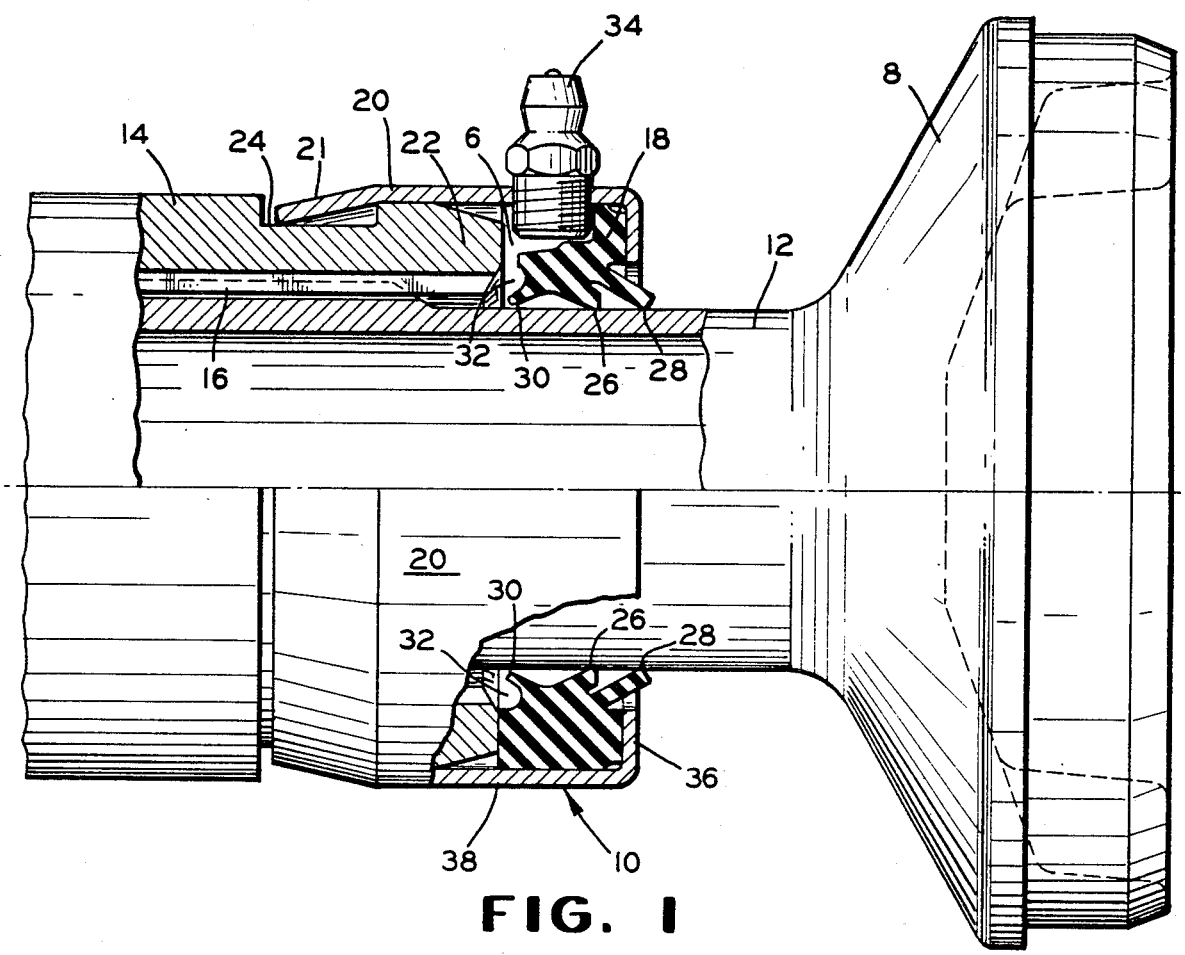
FIG. 1
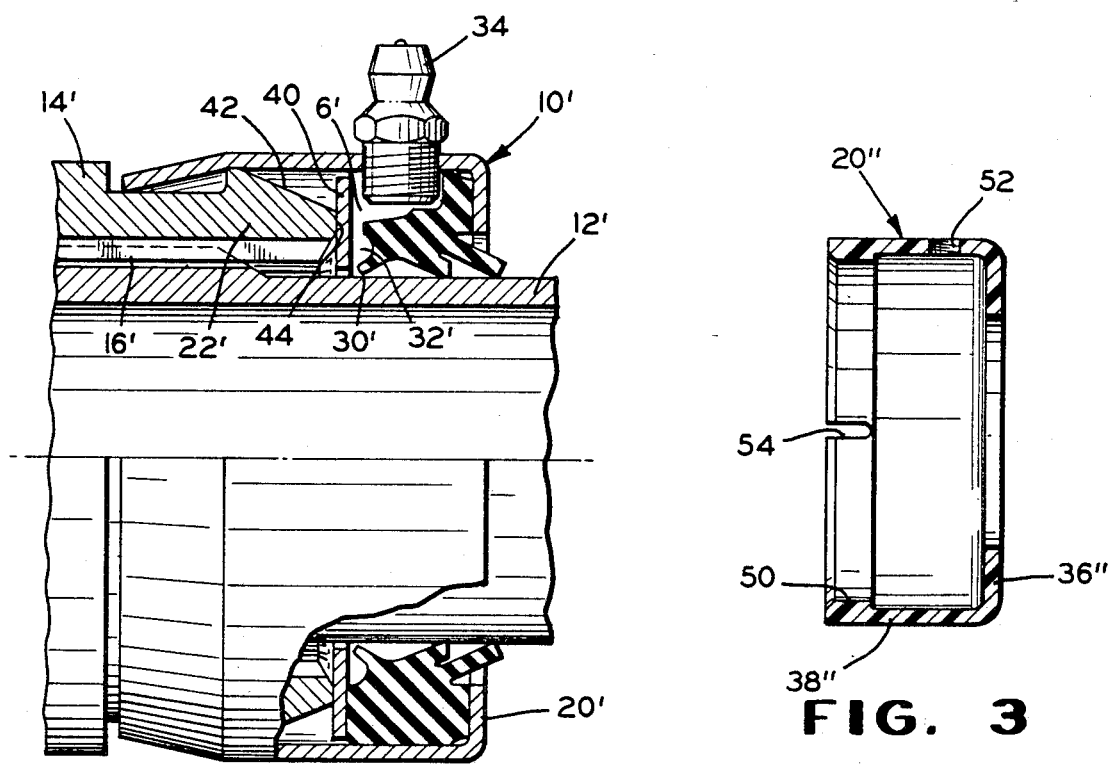
FIG. 2
FIG. 3

SLIP JOINT SEAL ASSEMBLY

BACKGROUND OF THE INVENTION

This invention relates to slip joint seal assemblies having elastomeric sealing bodies. More particularly, the invention relates to the effectiveness of such sealing bodies for controlling the flows of lubricant during relubrication of special lubrication chambers or cavities associated with such seal assemblies.

Prior art seal assemblies of the relubrication variety have been inadequate to effectively seal against escape of lubricant during relubrication. In seal assemblies which utilize sealing lips for the purpose of restraining flow of lubricant during relubrication, prior art lips have maintained constant contact with the shaft sealing surface and have become prematurely worn. In addition, such sealing members have occasionally given rise to phenomena which render the primary sealing of the assembly less effective. For example, one such assembly actually experiences a wobbling back-and-forth motion of the elastomeric sealing body along the shaft as the splined members are extended and retracted with respect to one another. This action allows contamination to enter into the otherwise protected internal spline region.

The problem would probably be exascerbated by the use of dual primary sealing lips, which could result in extra forces on the primary sealing lips. An improved elastomeric body seal assembly is needed over the assemblies available in the prior art, particularly in situations where dual primary lips will be utilized.

SUMMARY OF THE INVENTION

The slip joint seal assembly of the present invention provides a substantially improved relubrication sealing mechanism which avoids the problems of the prior art. The assembly includes an elastomeric auxiliary sealing lip which is angled toward the relubrication chamber region of the assembly. In addition, the auxiliary lip is designed to normally be out of contact with the shaft surface, and is thus disposed for engagement thereof only during relubrication.

In a preferred form, the assembly includes an annular elastomeric sealing body, and an annular metallic cage which circumferentially and radially supports the body. The seal assembly also defines an annular relubrication chamber. The interior of the sealing body defines a pair of parallel, angularly oriented primary sealing lips disposed for constant engagement with a shaft. The auxiliary sealing lip is positioned in communication with the relubrication chamber so that the lip will engage the shaft only during pressurization of the relubrication chamber. As a result, the improved assembly operates to prevent lubricant from flowing to the sealing lips, and instead directs lubricant to the slip spline joint region as desired.

BRIEF DESCRIPTION OF THE DRAWINGS

FIG. 1 is a fragmentary view, partly in section, of a slip joint seal assembly which contains a preferred embodiment of the present invention;

FIG. 2 is an alternate preferred embodiment of a slip joint seal assembly in accordance with the present invention; and FIG. 3 is a view of an alternate preferred embodiment of a cage which forms a part of the preferred assembly.

DETAILED DESCRIPTION OF PREFERRED EMBODIMENTS

A slip joint seal assembly 10 as depicted in FIG. 1 provides a lubricant sealing interface between a stub shaft 12 and a slip joint sleeve 14. The shaft 12 extends into the sleeve 14 and is coupled thereto by mating splines 16. The shaft 12 includes a coupling yoke 8 as shown.

The seal assembly 10 includes an elastomeric sealing body 18 supported in a metallic cage 20. The cage has radial and axial portions 36 and 38, respectively, and is secured to an end 22 of the slip joint sleeve 14 by its axial portion 38, in this particular example, by crimping. For this purpose, a circumferentially extending external groove 24 is included in the end 22 of the sleeve 14, into which the open end 21 of the cage 20 is crimped as shown. Referring to the lower half view of the assembly 10, the radial and axial portions 36 and 38 of the cage together provide support for the sealing body 18 without being bonded thereto. Hence, the use of conventional bonding adhesives is not required in the preferred embodiment.

The sealing body 18 contains two primary sealing lips 26 and 28 which are angularly disposed toward the yoke end of the stub shaft 12, and are designed for constant engagement of the shaft 12. Positioned rearwardly of the primary lips 26 and 28 is an auxiliary sealing lip 30 which is angularly disposed toward the slip joint sleeve 14. The auxiliary sealing lip 30 is designed for normal non-engagement with the shaft 12, and in a preferred form is spaced away from the shaft by an amount of four to twelve thousandths of an inch. As earlier noted, the lip 30 is designed for contact with the shaft only during relubrication of the assembly 10, and is hence positioned to be forced down onto the shaft surface by lubricant forced under pressure into an annular relubrication chamber 32. The relubrication chamber defines a lubrication-receiving cavity to which lubricant is admitted by means of a conventional Zerk fitting 34 which extends radially through the axial portion 38 of the cage 20. A cylindrical lubricant passageway 6 extends from the fitting 34 to the chamber 32. A comparison of the upper and lower halves of the assembly 10 will reveal that the relubrication chamber 32 generally defines an annular shaped volume or cavity, and as depicted in the upper half connects directly with the passageway 6 at the fitting 34 to enable admission of lubricant. As will be apparent to those skilled in the art, upon pressurization of the chamber during relubrication, the auxiliary sealing lip 30 will be forced radially inwardly against the surface of the shaft 12 to prevent lubrication from flowing toward the primary sealing lips 26 and 28. Instead, the lubrication will flow back into the region of the mating splines 16 as desired.

Referring now to FIG. 2, an alternate preferred embodiment of the slip joint seal assembly 10' is shown which is in all respects identical to the embodiment of FIG. 1 with the exception of an annular ring or washer 40. The washer 40 is utilized to enhance the tendency of the auxiliary sealing lip 30' to be forced down into contact with the shaft 12' during relubrication through the Zerk fitting 34'. For this purpose the washer is positioned against the extremity 44 of the end 22' of the sleeve 14' to limit the volume of the chamber 32' under conditions of relatively low viscosity of the lubricant and/or the geometry of the end 22' of the slip joint. In the immediate example, the sleeve 14' contains a substantial bevel 42 wherein lubricant would otherwise tend to be readily diverted from the region of the mating splines 16'. The washer 40 is not bonded to but is merely piloted by the cage 20'. In the preferred alternative embodiment, the interior diameter of the washer 40 will provide a clearance greater than that between the shaft 12' and the auxiliary sealing lip 30'.

FIG. 3 represents an alternate embodiment of the cage 20" which is constructed of a glass-filled nylon material as opposed to metal. As before, the cage defines radial and axial portions 36" and 38". However, the axial portion 38" contains an integral, radially inwardly projecting detent ring 50 for mating with the groove 24 of FIG. 1. A Zerk fitting may be installed through an aperture 52, while an axial split portion 54 allows flexing of the plastic body of the cage 20" for installation.

Although only a few preferred embodiments are detailed and described as shown herein, the appended claims will cover numerous equivalents which fall within the spirit and scope of the present invention.

What is claimed is:

1. A slip joint seal assembly comprising an annular, elastomeric sealing body, an annular cage supporting said body, said seal assembly further defining an annular relubrication chamber, wherein the internal portion of said sealing body includes at least one primary shaft sealing lip disposed for constant engagement with a shaft, said body portion further including an auxiliary sealing lip disposed for normal non-engagement of said shaft, whereby when said relubrication chamber is pressurized, said auxiliary sealing lip will be forced against the shaft to prevent lubricant from flowing to the sealing lip.

2. The slip joint seal assembly of claim 1 defining a cage having an axially extending portion and a radially extending portion, said axially extending portion having first and second ends, said first end adjoining said radially extending portion and disposed for supporting said elastomeric sealing body, said second end disposed for being secured to a slip spline sleeve.

3. The slip joint seal assembly of claim 2 wherein said radially extending portion of said cage is disposed for overlying a stub shaft splined to a sleeve, and wherein said portion defines a surface for radial support of said elastomeric sealing body.

4. The slip joint seal assembly of claim 3 wherein said relubrication chamber includes means for supplying lubricant through said axially extending portion of said cage.

5. The slip joint seal assembly of claim 1 wherein said primary sealing lip and said auxiliary lip both extend angularly toward said shaft, the axially extending component of each being oppositely directed from the other along said shaft.

6. The slip joint seal assembly of claim 4 wherein said assembly further comprises an annular ring positioned adjacent the extremity of said sleeve, said ring piloted by said cage.

7. The slip joint seal assembly of claim 6 wherein said means for lubrication to said relubrication chamber comprises a Zerk fitting which extends into said axially extending portion of said cage.

8. The slip joint seal assembly of claim 7 wherein said sleeve comprises a circumferentially extending external groove for receiving said second end of said cage upon the radial crimping thereof.

9. The slip joint seal assembly of claim 8 wherein said elastomeric body portion includes at least two angularly oriented sealing lips.

10. The slip joint assembly of claim 1 wherein said auxiliary sealing lip is disposed for being spaced away from the shaft by an amount of 4 to 12 thousandths of an inch.

11. The slip joint assembly of claim 1 further comprising an annular ring interposed between said sealing body and said chamber, said ring piloted in said cage, whereby said relubrication chamber is radially bounded by said ring.

12. The slip joint assembly of claim 1 wherein said cage is metallic.

13. The slip joint assembly of claim 1 wherein said cage is plastic.

14. The slip joint assembly of claim 13 wherein said cage comprises an integral, radially inwardly projecting detent ring disposed for securement of the cage.

15. A slip joint seal assembly comprising an annular, elastomeric sealing body, an annular cage supporting said body, said assembly defining an annular relubrication chamber, the interior of said sealing body including two shaft sealing lips disposed for constant engagement with a shaft, said sealing body further including an auxiliary sealing lip disposed for normal non-engagement of said shaft, whereby when said relubrication chamber is pressurized, said barrier lip will engage the shaft to prevent lubrication from flowing to the sealing lip, said assembly further comprising an annular ring disposed for being positioned against the extremity of a slip spline sleeve, said ring being piloted by said cage and having a clearance with respect to said shaft which is greater than the clearance between said auxiliary sealing lip and the rotary shaft.

* * * * *